(12) United States Patent
Palfai et al.

(10) Patent No.: US 8,430,776 B2
(45) Date of Patent: Apr. 30, 2013

(54) ANTI-ROTATION PIN FOR A PLANETARY GEAR UTILIZING A TWO-PIECE CARRIER

(75) Inventors: Balazs Palfai, Fishers, IN (US); Attila Nagy, Fishers, IN (US); Andrew Meyer, Fortville, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 274 days.

(21) Appl. No.: 12/950,602

(22) Filed: Nov. 19, 2010

(65) Prior Publication Data
US 2012/0129642 A1    May 24, 2012

(51) Int. Cl.
*F16H 3/72* (2006.01)
*F16H 37/06* (2006.01)

(52) U.S. Cl.
USPC ............. 475/5; 475/331; 74/650; 74/665 R

(58) Field of Classification Search ............. 475/5, 331; 74/650, 665 R
See application file for complete search history.

(56) References Cited

U.S. PATENT DOCUMENTS

| 5,292,292 | A | * | 3/1994 | Heinrich et al. | 475/331 |
| 5,396,968 | A | * | 3/1995 | Hasebe et al. | 180/65.6 |
| 6,561,945 | B2 | * | 5/2003 | Shattuck et al. | 475/331 |
| 2004/0259678 | A1 | * | 12/2004 | Stille et al. | 475/331 |

FOREIGN PATENT DOCUMENTS
CN    201457048 U  *  5/2010

* cited by examiner

Primary Examiner — Justin Holmes
(74) Attorney, Agent, or Firm — Cantor Colburn LLP

(57) ABSTRACT

A planetary gear set includes a ring gear having an inner diametric surface that defines an inner ring gear portion. A carrier assembly is arranged within the inner ring gear portion. The carrier assembly includes a carrier member having a carrier member body including a planet gear support surface and at least one carrier plate support member that extends substantially perpendicularly from the planet gear support surface. The at least one carrier plate support member includes a carrier plate support element having an opening. At least one planet gear pin extends from a first end portion arranged at the planet gear support surface to a second end portion, and at least one anti-rotation pin extends from a first end section arranged at the planet gear support surface through the opening in the carrier plate support element to a second end section.

20 Claims, 5 Drawing Sheets

ANTI-ROTATION PIN FOR A PLANETARY GEAR UTILIZING A TWO-PIECE CARRIER

BACKGROUND OF THE INVENTION

Exemplary embodiments pertain to the art of planetary gear sets and, more particularly, to an anti-rotation pin for a planetary gear set utilizing a two-piece carrier.

Epicyclic or planetary gear sets are often used to achieve a reduction in rotation from one member to another. A typically planetary gear set includes one or more outer or planet gears that revolve around a central or sun gear. In certain configurations, the sun gear is replaced by an input shaft. The planet gears are typically rotate relative to the sun gear. In many arrangements, the planet gears are supported by a carrier that is in a geared relationship with an outer or ring gear. Depending upon the relative gearing of each of the plant gears, carrier and ring gear, a desired gear output speed/rotation relative to input speed/rotation is achieved. Also, variable speed/rotation changes can be achieved by holding one or the other of the planet gears, carrier and ring gear stationary.

In order to simplify manufacturing, the carrier is often formed from two pieces. The two pieces facilitate mounting of the planet gears to shafts supported by the carrier. During assembly, planet gears are mounted to shafts that are supported on a first carrier half. Once the planet gears are installed, a second carrier half is joined to the first carrier half. The first and second carrier halves are held together with shear pins that are configured to prevent rotation of one of the first and second halves relative to another of the first and second halves.

BRIEF DESCRIPTION OF THE INVENTION

Disclosed is a planetary gear set including a ring gear having an inner diametric surface that defines an inner ring gear portion. The inner diametric surface includes a plurality of ring gear teeth. A carrier assembly is arranged within the inner ring gear portion. The carrier assembly includes a carrier member having a carrier member body including a planet gear support surface and at least one carrier plate support member that extends substantially perpendicularly from the planet gear support surface. The at least one carrier plate support member includes a carrier plate support element having an opening. At least one planet gear pin extends from a first end portion arranged at the planet gear support surface to a second end portion, and at least one anti-rotation pin extends from a first end section arranged at the planet gear support surface through the opening in the carrier plate support element to a second end section.

Also disclosed is a transmission member including a housing, a stator assembly arranged within the housing, a rotor assembly arranged within the housing and rotatably mounted relative to the stator, an output member operatively coupled to the rotor assembly, and a planetary gear set operatively coupled to the rotor assembly. The planetary gear set includes a ring gear having an inner diametric surface that defines an inner ring gear portion. The inner diametric surface includes a plurality of ring gear teeth. A carrier assembly is arranged within the inner ring gear portion. The carrier assembly includes a carrier member having a carrier member body including a planet gear support surface and at least one carrier plate support member that extends substantially perpendicularly from the planet gear support surface. The at least one carrier plate support member includes a carrier plate support element having an opening. At least one planet gear pin extends from a first end portion arranged at the planet gear support surface to a second end portion, and at least one anti-rotation pin extends from a first end section arranged at the planet gear support surface through the opening in the carrier plate support element to a second end section.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
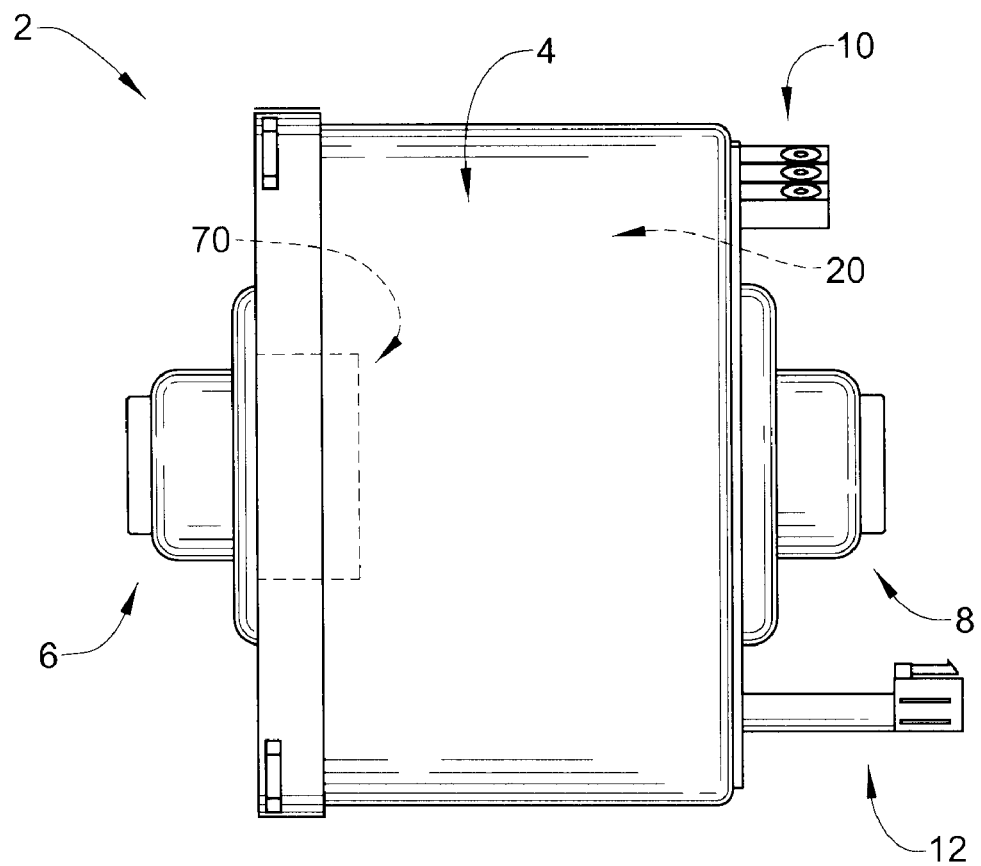
FIG. 1 depicts an outline of a transmission member having a planetary gear set including a two piece carrier provided with an anti-rotation pin in accordance with an exemplary embodiment.

With reference to FIG. 1, a transmission member constructed in accordance with an exemplary embodiment is indicated generally at 2. Transmission member 2 includes a housing 4 having a first output hub 6 and a second output hub 8. First and second output hubs 6 and 8 provide an interface to corresponding first and second drive wheels (not shown). Transmission member 2 is also shown to include electric power terminals 10 and a signal or sensor connector 12. As will be discussed more fully below, power terminals 10 and sensor connector 12 are electrically connected to an electric motor 20 arranged within housing 4.

Figure 2:
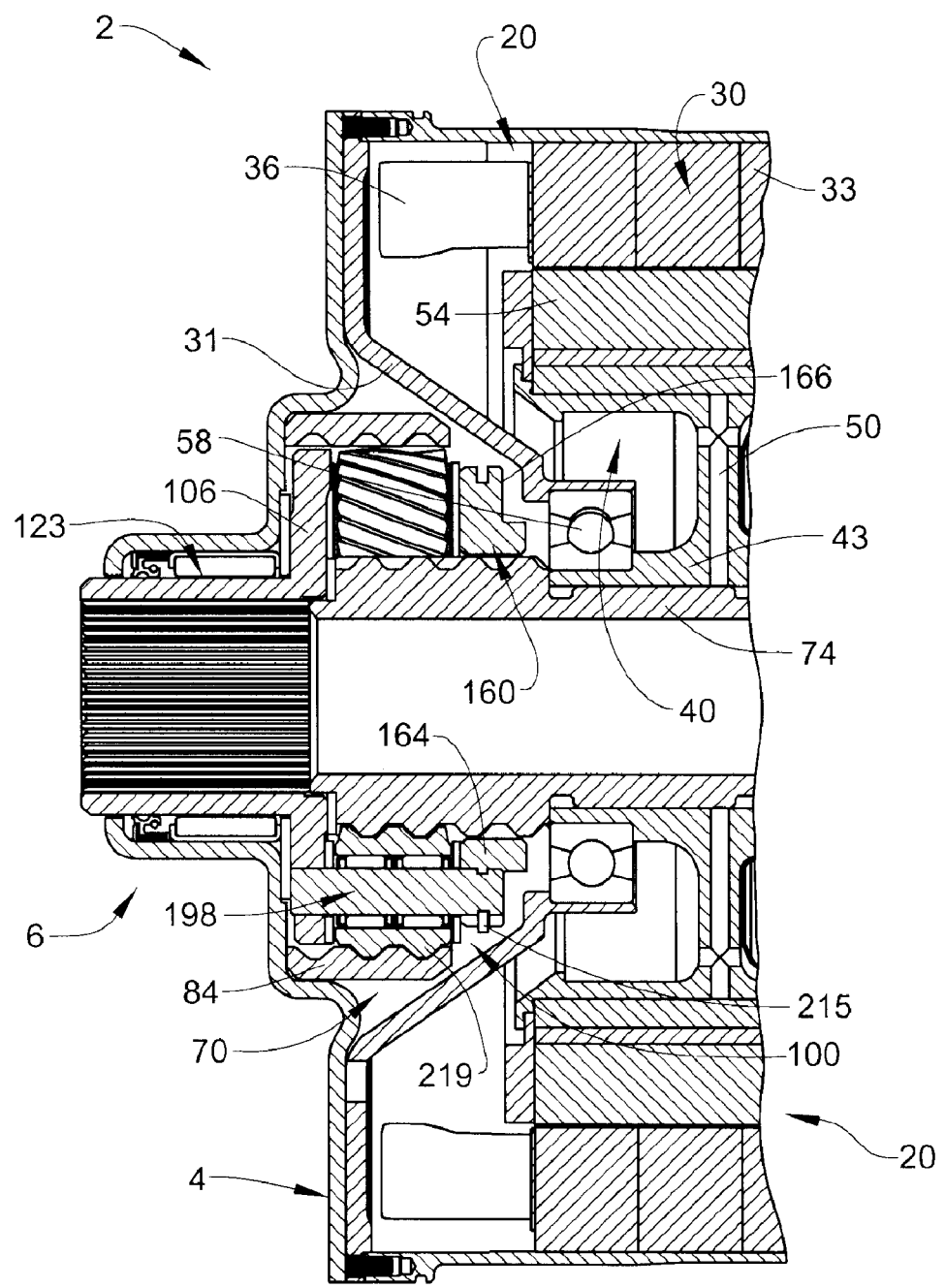
FIG. 2 depicts a partial cross-sectional view of the transmission member of FIG. 1 illustrating the planetary gear set in accordance with an exemplary embodiment.

As best shown in FIG. 2, electric motor 20 includes a stator assembly 30 having a stator housing 31. A stator core 33 is arranged within stator housing 31. Stator core 33 is surrounded by a plurality of stator windings 36. Electric motor 20 also includes a rotor assembly 40 that is rotatably mounted relative to stator assembly 30. Rotor assembly 40 includes a hub portion 43. Hub portion 43 includes a lamination support element 50 that supports a plurality of rotor laminations 54. Hub portion 43 is rotatably supported relative to stator housing 31 by first and second bearings, one of which is shown at 58. As will be discussed more fully below, hub portion 43 is operatively connected to a planetary gear set 70 through a shaft 74.

Figure 3:
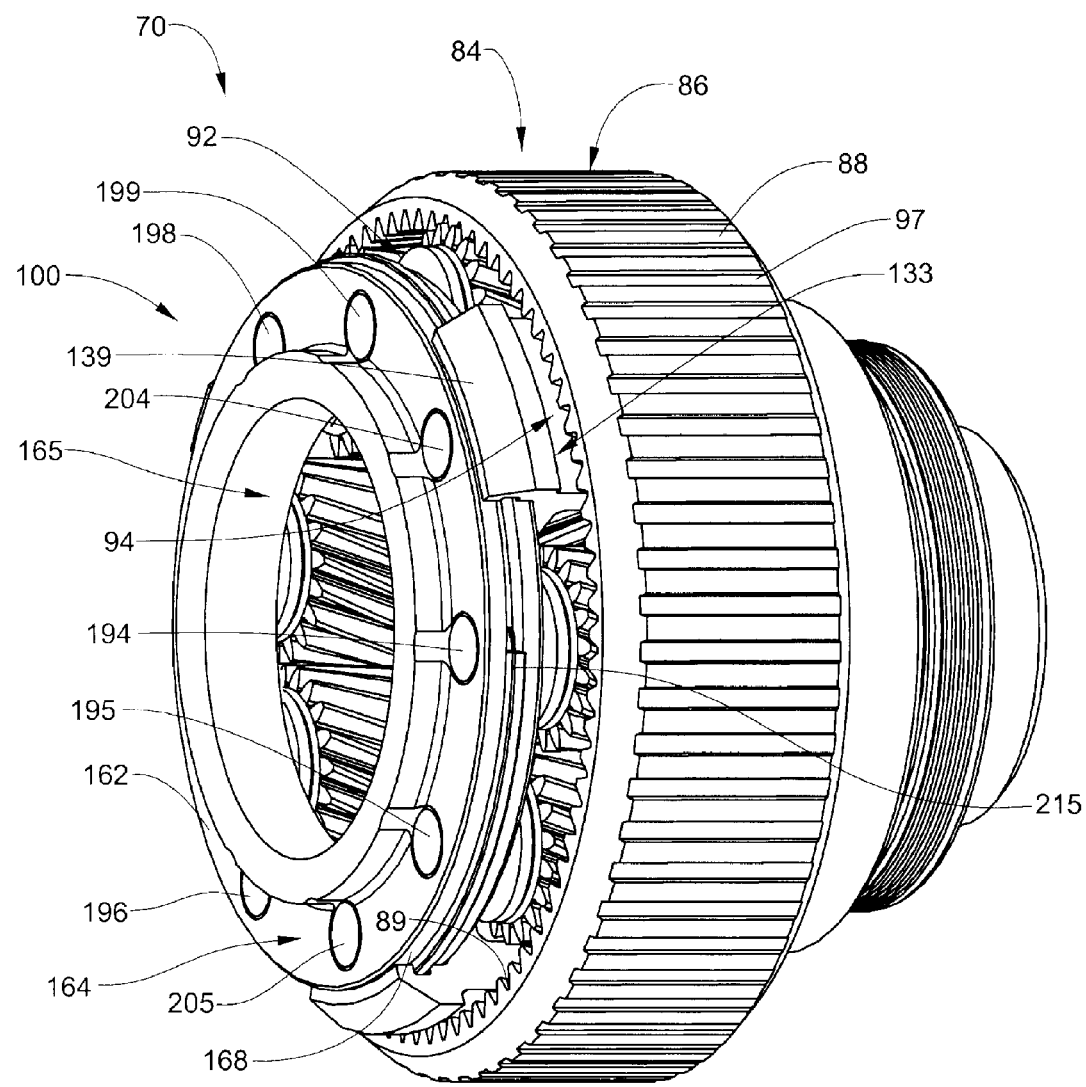
FIG. 3 is a perspective view of the planetary gear set including a carrier assembly in accordance with an exemplary embodiment.
Figure 4:
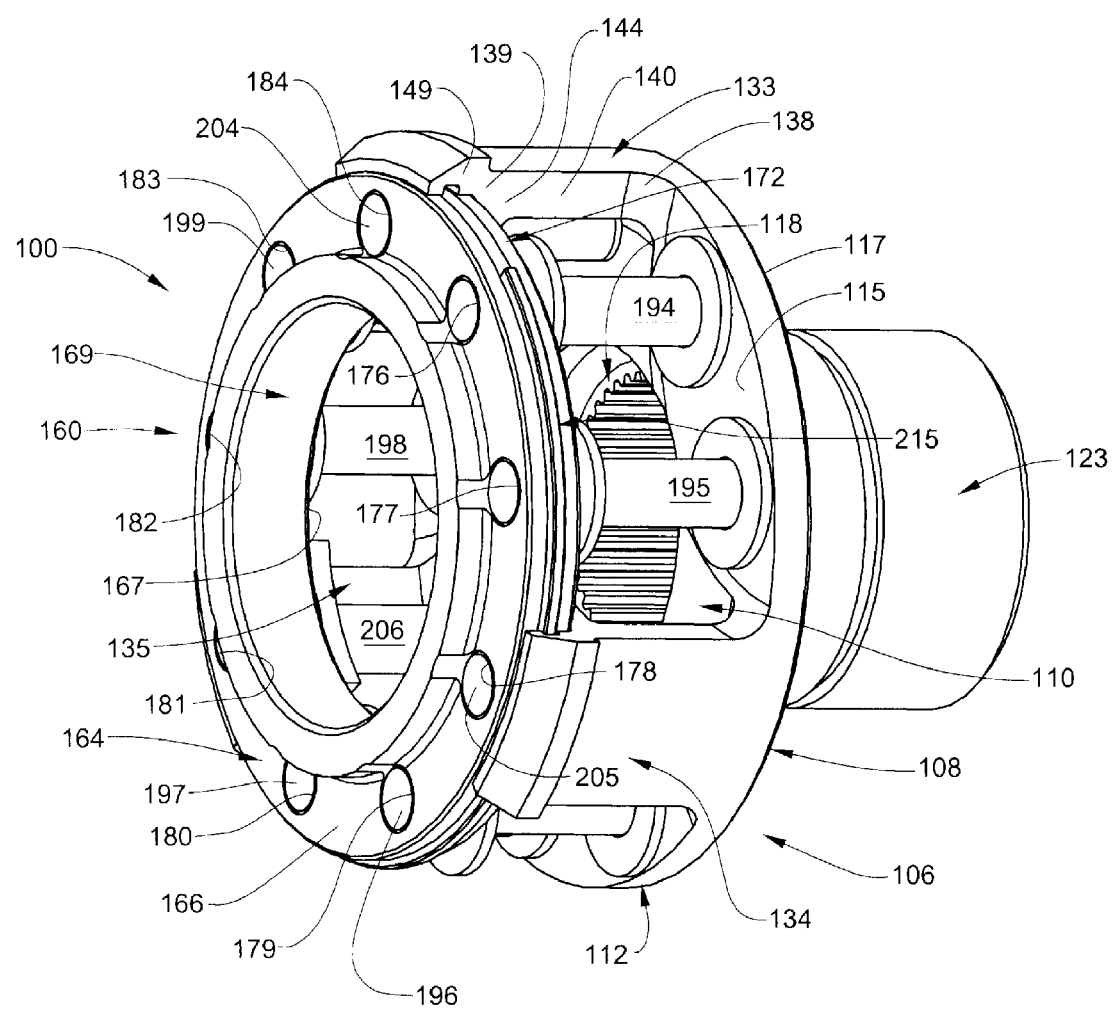
FIG. 4 is a perspective view of the carrier assembly of FIG. 3 illustrating planet gear pins and anti-rotation pins in accordance with an exemplary embodiment.
Figure 5:
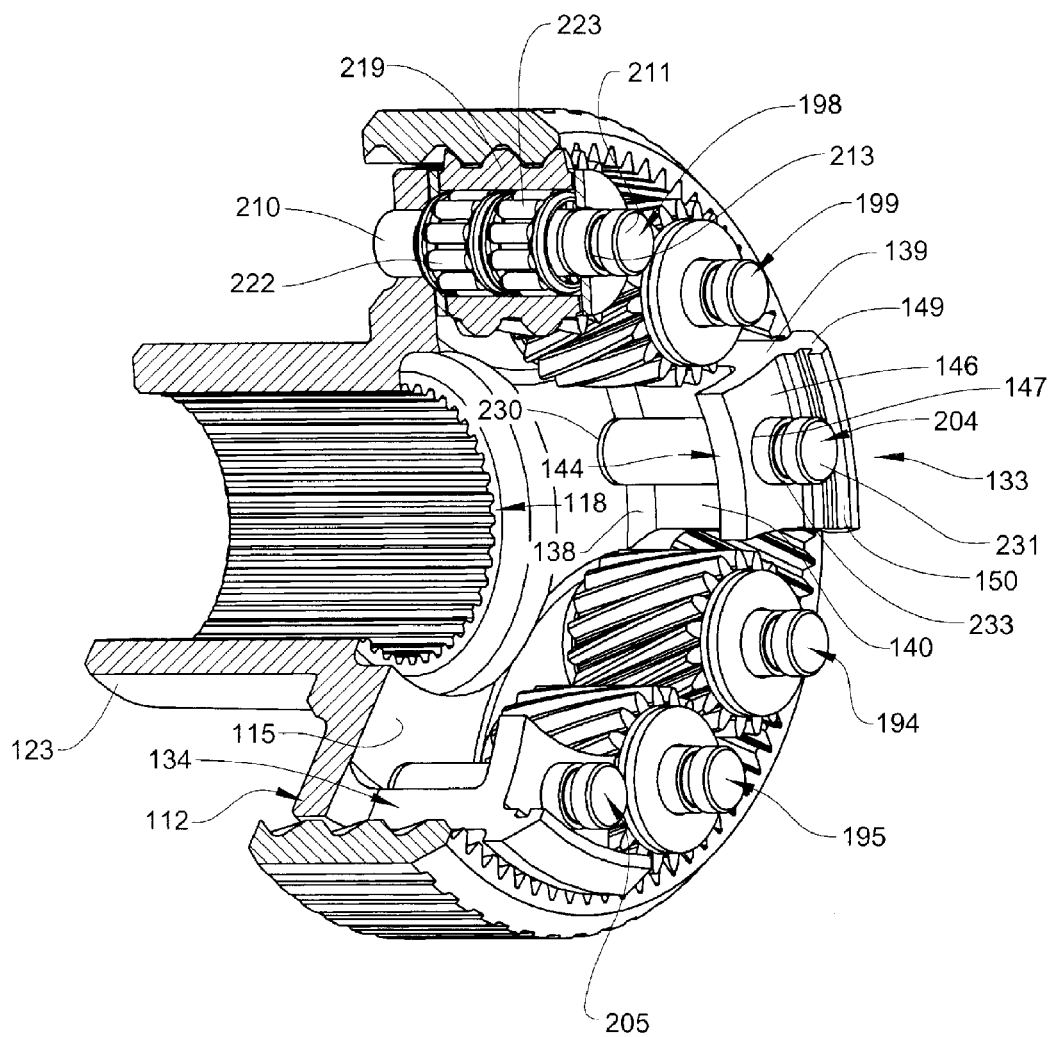
FIG. 5 is a partial, cross-sectional view of the planetary gear set of FIG. 3 illustrating a carrier member of the carrier assembly of FIG. 4.

Referencing FIGS. 3-5, planetary gear set 70 includes a ring gear 84 having a ring gear body 86. Ring gear body 86 includes an outer diametric surface 88 and an inner diametric surface 89 that defines an inner ring gear portion 92. In the exemplary embodiment shown, inner diametric surface 89 includes a plurality of ring gear teeth, one of which is shown at 94 and outer diametric surface 88 includes a plurality of recessed portions, one of which is indicated at 97, that defines an antiturn feature for ring gear 84. Planetary gear set 70 is further shown to include a carrier assembly 100 arranged within inner ring gear portion 92.

In accordance with an exemplary embodiment, carrier assembly 100 includes a carrier member 106 having a carrier member body 108 that defines an inner carrier portion 110. Carrier member body 108 includes a base portion 112 having a planet gear support surface 115 and an opposing hub support surface 117 that define a central opening 118. Central opening 118 is coupled to a geared output hub 123 that extends through output hub 6. Carrier member 106 is also shown to include a plurality of carrier plate support members 133-135 that extend substantially perpendicularly from base portion 112. As each carrier plate support member 133-135 is substantially similar, a detailed description will follow referencing carrier plate support member 133 with an understanding that the remaining carrier plate support members 134 and 135 are similarly constructed.

Carrier plate support member 133 includes a first end 138 that extends to a second end 139 through an intermediate portion 140. Carrier plate support member 133 is also shown to include a carrier plate support element 144 arranged at second end 139. Carrier plate support element 144 includes a substantially planar surface 146 having an opening 147. Carrier plate support member 133 is further shown to include an outer edge portion 149 that extends beyond carrier plate support element 144. Outer edge portion 149 includes a curvilinear surface 150.

Carrier assembly 100 is further shown to include a carrier plate 160 which, as will be discussed more fully below, is joined to carrier member 106. Carrier plate 160 includes a carrier plate body 164 having a first surface 166 and a second, opposing surface 167 that define a central opening 169. Central opening 169 is configured to receive shaft 74. Carrier plate 160 is further shown to include an outer diametric edge 172 and a plurality of mounting members or openings 176-184 that extend between first and second surfaces 166 and 167. Carrier plate 160 rests upon carrier plate support element 144 of each carrier plate support member 133-135. More specifically, second surface 167 of carrier plate 160 rests upon substantially planar surface 146 of carrier plate support element 144. With this arrangement, outer edge portion 149 receives outer diametric edge 172.

As shown in FIGS. 4 and 5, carrier plate 160 is joined to carrier member 106 through a plurality of planet gear pins 194-199 and a plurality of anti-rotation pins 204-206. Planet gear pins 194-199 and anti-rotation pins 204-206 are substantially similar in diameter and cooperate to prevent any relative rotation of carrier plate 160 relative to carrier member 106 as will be discussed more fully below. At this point, a detailed description will follow referencing planet pin 198 with an understanding that the remaining planet pins, 194-197, and 199 include corresponding structure. Planet pin 198 includes a first end portion 210 that extends from planet gear support surface 115 to a second end portion 211 having an annular groove element 213 that is configured to receive a locking ring 215. Planet pin 198 is, for example, press-fit into base portion 112 and supports a planet gear 219 through first and second bearings 222 and 223. As second end portion 211 is cantilevered from planet gear support surface 115, radial forces developed during operation of transmission member 2 could create sheer stresses that may result in a relative rotation of carrier plate 160 and carrier member 106. In order to combat any sheer forces that may develop, anti-rotation pins 204-206 provide further support. By shortening the lever arm of a cantilevered beam any prevailing bending stresses are diverted to a more manageable sheer stress As each anti-rotation pin 204-206 is similarly formed, a detailed description will follow referencing anti-rotation pin 204 with an understanding that the remaining anti-rotation pins 205 and 206 are similarly formed. Anti-rotation pin 204 includes a first end section 230 that extends from planet gear support surface 115, through opening 147 in carrier plate support element 133 to a second end section 231. More specifically, anti-rotation pin 204 is guided through opening 147 and first end section 230 is pres-fit into base portion 112. In a manner similar to that described above, second end section 231 includes an annular groove member 233 that is configured to receive locking ring 215. Once all planet pins 194-199 and anti-rotation pins 204-206 are mounted to carrier member 106, and all planet gears are assembled, carrier plate 160 is added. More specifically, mounting members 176-184 are aligned with planet pins 194-199 and anti-rotation pins 204-206 and carrier plate 160 is, for example, press-fit to carrier member 106 until second surface 167 abuts substantially planer surface 146.

With this arrangement, added support provided by carrier plate support element 133 provides anti-rotation pin 204 with an enhanced ability to withstand any sheer forces that my develop between carrier plate 160 and carrier member 106. In addition, using components having substantially similar diameters for both a pin support and an anti-rotation feature contributes to higher manufacturing quality by, for example, utilizing one step simultaneous drilling. At this point it should be understood that while described as having substantially similar diameters, the planet pins and anti-rotation pins may be of equal or unequal lengths. Also, while shown with two output hubs, it should be understood that the planet pins and anti-rotation pins can be incorporated into a transmission member having a non-differential planetary gear set.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:
1. A planetary gear set comprising:
a ring gear having an inner diametric surface that defines an inner ring gear portion, the inner diametric surface including a plurality of ring gear teeth; and
a carrier assembly arranged within the inner ring gear portion, the carrier assembly including:
a carrier member having a carrier member body including a planet gear support surface and at least one carrier plate support member that extends substantially perpendicularly from the planet gear support surface, the at least one carrier plate support member including a carrier plate support element having an opening;
at least one planet gear pin extending from a first end portion arranged at the planet gear support surface to a second end portion; and
at least one anti-rotation pin extending from a first end section arranged at the planet gear support surface through the opening in the carrier plate support element to a second end section.

2. The planetary gear set according to claim 1, further comprising: a carrier plate mounted to the carrier member, the carrier including a carrier plate body having at least two mounting members, one of the at least two mounting members receiving one of the at least one planet gear pin and at least one anti-rotation pin and the other of the at least two mounting members receiving the other of the at least one planet gear pin and at least one anti-rotation pin.

3. The planetary gear set according to claim 2, wherein the carrier plate body includes a first surface and a second opposing surface that defines an outer diametric edge, the at least two mounting members extending between the first and second surfaces.

4. The planetary gear set according to claim 3, wherein the carrier plate support element extends substantially perpendicularly, from the carrier plate support member.

5. The planetary gear set according to claim 4, wherein the first surface of the carrier plate body rests upon the carrier plate support element.

6. The planetary gear set according to claim 3, wherein the carrier plate support member includes an outer edge portion that projects beyond the carrier plate support element, the outer edge portion including a curvilinear surface that is configured and disposed to receive the outer circumferential edge of the carrier plate body.

7. The planetary gear set according to claim 1, further comprising: a planet gear rotatably mounted to the at least one planet gear pin.

8. The planetary gear set according to claim 7, further comprising: a bearing arranged between the planet gear and the planet gear pin.

9. The planetary gear set according to claim 1, wherein the second end section of the at least one anti-rotation pin includes an annular groove member.

10. The planetary gear set according to claim 1, wherein the second end portion of the planet gear pin includes an annular groove element.

11. A transmission member comprising:
a housing;
a stator assembly arranged within the housing;
a rotor assembly arranged within the housing and rotatably mounted relative to the stator;
an output member operatively coupled to the rotor assembly; and
a planetary gear set operatively coupled to the rotor assembly, the planetary gear set comprising:
a ring gear having an inner diametric surface that defines an inner ring gear portion, the inner diametric surface including a plurality of ring gear teeth; and
a carrier assembly arranged within the inner ring gear portion, the carrier assembly including:
a carrier member having a carrier member body including a planet gear support surface and at least one carrier plate support member that extends substantially perpendicularly from the planet gear support surface, the at least one carrier plate support member including a carrier plate support element having an opening;
at least one planet gear pin extending from a first end portion arranged at the planet gear support surface to a second end portion; and
at least one anti-rotation pin extending from a first end section arranged at the planet gear support surface through the opening in the carrier plate support element to a second end section.

12. The transmission member according to claim 11, wherein the carrier plate support element extends substantially perpendicularly, from the carrier plate support member.

13. The transmission member according to claim 11, further comprising: a carrier plate mounted to the carrier member, the carrier including a carrier plate body having at least two mounting members, one of the at least two mounting members receiving one of the at least one planet gear pin and at least one anti-rotation pin and the other of the at least two mounting members receiving the other of the at least one planet gear pin and at least one anti-rotation pin.

14. The transmission member according to claim 13, wherein the carrier plate body includes a first surface and a second opposing surface that defines an outer circumferential edge, the at least two mounting members extending between the first and second surfaces.

15. The transmission member according to claim 14, wherein the first surface of the carrier plate body rests upon the carrier plate support element.

16. The transmission member according to claim 14, wherein the carrier plate support member includes an outer edge portion that projects beyond the carrier plate support element, the outer edge portion including a curvilinear surface that is configured and disposed to receive the outer circumferential edge of the carrier plate body.

17. The transmission member according to claim 11, further comprising: a planet gear rotatably mounted to the at least one planet gear pin.

18. The transmission member according to claim 17, further comprising: a bearing arranged between the planet gear and the planet gear pin.

19. The transmission member according to claim 11, wherein the second end section of the at least one anti-rotation pin includes an annular groove member.

20. The transmission member according to claim 11, wherein the second end portion of the planet gear pin includes an annular groove element.

* * * * *